United States Patent
Ban et al.

[11] Patent Number: 5,908,480
[45] Date of Patent: Jun. 1, 1999

[54] PARTICULATE TRAP FOR DIESEL ENGINE

[75] Inventors: Shunsuke Ban; Youichi Nagai, both of Itami; Kiyoshi Kobashi, Mishima; Hiromichi Yanagihara, Gotemba, all of Japan

[73] Assignees: Sumitomo Electric Industries, Ltd., Osaka, Japan; Toyota Jidosha Kabushiki Kaisha, Toyota, Japan

[21] Appl. No.: 08/828,713

[22] Filed: Mar. 28, 1997

[30] Foreign Application Priority Data

Mar. 29, 1996 [JP] Japan .................................. 8-077230

[51] Int. Cl.$^6$ .................................................. B01D 29/07
[52] U.S. Cl. ............................... 55/482; 55/498; 55/520; 55/521; 55/524; 55/525; 55/DIG. 30; 60/311
[58] Field of Search ........................... 55/498, 520, 521, 55/525, 497, DIG. 30, 526, 482, 524; 60/311

[56] References Cited

U.S. PATENT DOCUMENTS

| 1,729,135 | 9/1929 | Slauson | 55/520 |
|---|---|---|---|
| 2,397,759 | 4/1946 | Sigmund | 55/520 |
| 3,020,977 | 2/1962 | Huppke et al. | 55/520 |
| 3,966,646 | 6/1976 | Noakes et al. | 55/520 |
| 4,439,321 | 3/1984 | Taki et al. . | |
| 4,441,899 | 4/1984 | Takagi et al. . | |
| 4,652,286 | 3/1987 | Kusada et al. | 55/523 |
| 5,130,100 | 7/1992 | Serizawa | 55/520 |
| 5,505,757 | 4/1996 | Ishii | 55/525 |
| 5,562,825 | 10/1996 | Yamada et al. | 55/520 |
| 5,709,722 | 1/1998 | Nagai et al. . | |

FOREIGN PATENT DOCUMENTS

| 0 035 053 A1 | 9/1981 | European Pat. Off. . |
|---|---|---|
| 0 562 412 A2 | 9/1993 | European Pat. Off. . |
| 0 606 071 A1 | 7/1994 | European Pat. Off. . |
| 884920 | 5/1943 | France . |
| 07051522 | 2/1995 | Japan . |

*Primary Examiner*—Jay H. Woo
*Assistant Examiner*—Robert Hopkins
*Attorney, Agent, or Firm*—Wenderoth, Lind & Ponack, L.L.P.

[57] ABSTRACT

A particulate trap for use in a diesel engine which is inexpensive, and which is high in particulate trapping efficiency, regeneration properties and durability, and low in pressure loss due to particulates trapped. An even number of flat filters made from a non-woven fabric of heat-resistant metallic fiber are laminated alternately with the same number of corrugated sheets made of a heat-resistant metal. The laminate thus formed are rolled into a columnar shape. Each space between the adjacent flat filters in which every other corrugated sheet is inserted is closed at one end of the filter element by a closure member. The other spaces between the adjacent flat filters are closed at the other end of the filter element.

20 Claims, 13 Drawing Sheets

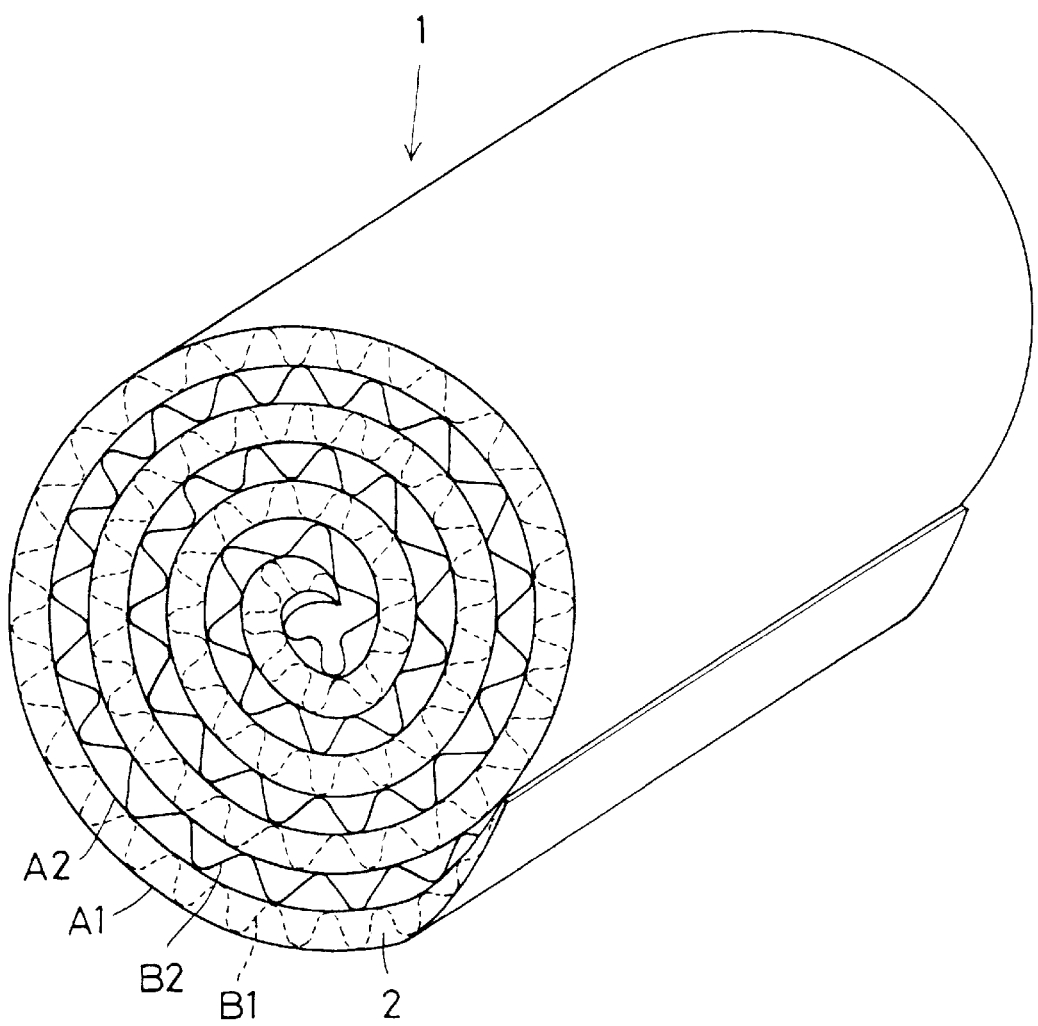

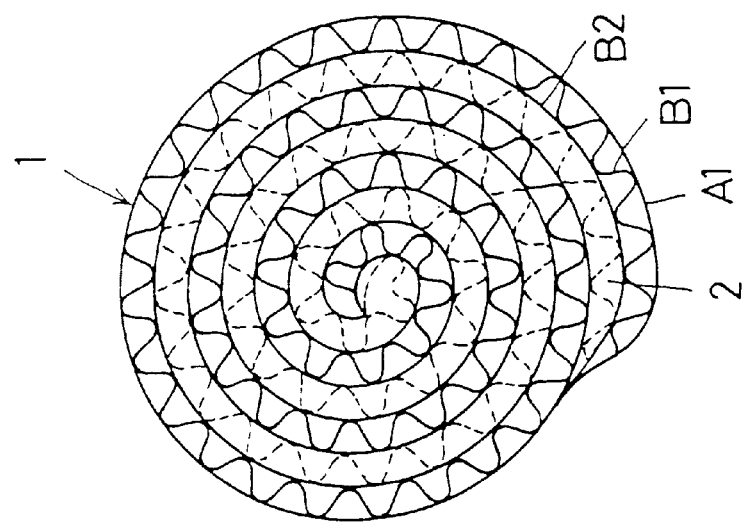
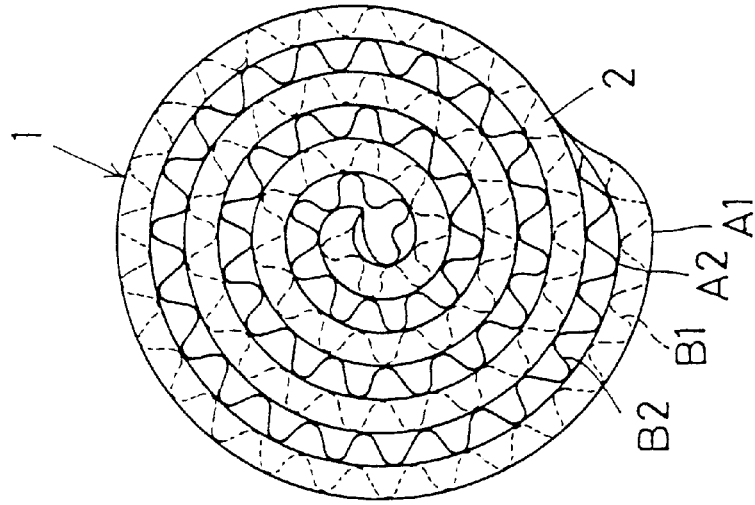
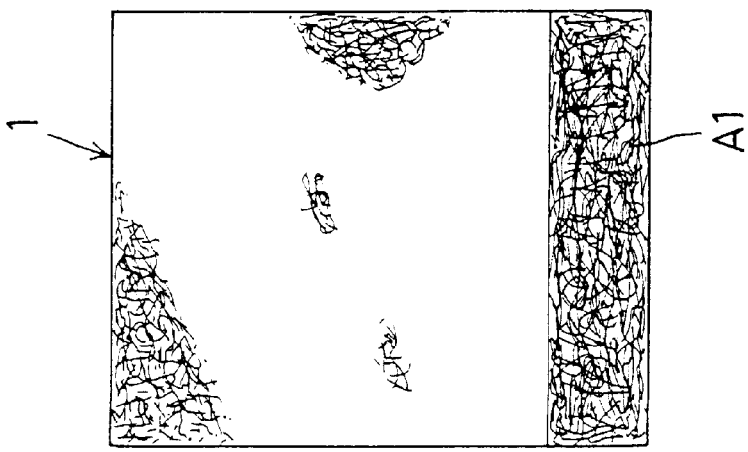

FILTER SUBSTRATE 7
ALUMINA WHISKER 8

EXHAUST GAS FLOW

FILTER
- CATALYST-CARRYING LAYER 32
- PARTICULATE FILTER LAYER 31
- CATALYST-CARRYING LAYER 33

PARTICULATE TRAP FOR DIESEL ENGINE

BACKGROUND OF THE INVENTION

The present invention relates to a particulate trap for trapping and removing particulates such as carbon contained in diesel engine exhausts and for removing any noxious components in exhausts.

Exhaust gases from automobiles are a major cause of air pollution. It is therefore of extreme importance to develop a technique for removing noxious components in exhausts.

In particular, the development of a technique for removing particulate components in diesel engine emissions, which are mainly made up of NOx and carbon is urgently required.

To remove such noxious components in exhausts, Unexamined Japanese Patent Publication 58-51235 proposes to provide an exhaust trap in an exhaust line to trap any noxious components and remove them by after-treatment Other conventional exhaust purifying means include various improvements in the engine itself such as exhaust gas recirculation (EGR) systems and improved fuel injection systems. But none of them has proved to be an effective solution. After-treatment methods are currently considered more practical as exhaust purifying means. Thus, rigorous efforts are now being made to develop after-treatment type exhaust purifying systems.

It is required that particulate traps for trapping particulates contained in diesel engine emissions satisfy all of the following requirements.

1) Particulate trapping capability

A particulate trap must be capable of trapping particulates with high efficiency and so that exhausts are satisfactorily purified. It is considered necessary to trap an average of at least 60% of the particulates contained in diesel engine emissions, even though the amount of particulates contained in exhausts depends upon the displacement of the diesel engine and the load applied.

Airborne particulates 2 $\mu$m or less in diameter can enter human alveoli and reportedly trigger lung cancer. It is thus necessary that particulate traps be capable of efficiently trapping even these small suspended particulates.

2) Pressure loss

The particulate trap must be capable of keeping the pressure loss in exhaust gases to a minimum If it causes a large pressure loss, a back pressure will act on the engine, aggravating the engine performance in various ways. Thus, it is necessary to keep the pressure loss to less than 30 kPa in a normal state. For this purpose, the particulate trap has to have a sufficiently small initial exhaust pressure loss, and also be capable of keeping the pressure loss to a minimum even after it has trapped a large amount of particulates.

3) Regeneration

The third requirement is that the trap can be regenerated at low energy cost. This is because the particulate trap has to be regenerated or recycled many times for repeated use by burning trapped particulates. An electric heater or a light oil burner is considered a feasible means for burning off particulates.

4) Durability

Fourthly, the trap must be sufficiently durable. It must be highly resistant to corrosion when exposed to hot exhaust gases and to heat shocks produced while burning particulates.

5) Integration with a catalytic converter

Furthers it is necessary to provide a catalytic converter integral with the trap. In order to remove noxious gas components in exhausts, a catalytic converter carrying a noxious gas removing catalyst may be provided in an engine exhaust line. If it is desired to further provide a separate particulate trap in the same exhaust lines there may be no available mounting space in the exhaust line. Also, the cost for separately providing these two different after-treatment type exhaust purifying systems tends to be rather high.

Among the existing filter element materials that satisfy the above-listed requirements, a wall-flow type, honeycomb porous member made of cordierite ceramics is considered the most practical. But this filter has several problems. One problem is that particulates tend to collect locally. Another problem is that, because of low thermal conductivity of cordierite ceramic, this filter tends to develop heat spots during regeneration. As a result, the filter may melt or crack due to thermal stress. Such a filter is not durable enough. A ceramic fiber trap made by forming ceramic fibers into a candle shape is gaining much attention recently. But this trap is not sufficiently durable either. The fibers forming the trap tend to break due to reduced strength when exposed to high-temperature exhaust gases.

Metal traps (as disclosed in Unexamined Japanese Patent Publications 6-257422, 6-294313, 7-731 and 7-51522) are now considered more promising, because they are high in thermal conductivity, less likely to develop heat spots and cracks and highly corrosion-resistant in high-temperature exhausts.

The problems of conventional metal traps in connection with the abovementioned requirements 1)–5) will now be discussed.

Conventional metal traps basically satisfy the requirements 1) and 3). But as to the capacity of trapping suspended particulates 2 $\mu$m or less in diameter in the requirement 1), higher performance is desired.

As to the requirement 2), conventional metal traps can cause a marked pressure loss after trapping particulates. If an especially low engine back pressure is required, these traps will be unsatisfactory.

In order to minimize the pressure loss even after the filter element has trapped a large amount of particulates, the filter element must have a large surface area (filtering area). But in order to increase the filtering area of a conventional metal trap filter element, it is necessary to use an extremely large trap.

In connection with the requirement 4): the filter element of a conventional metal trap is deformed microscopically due to the pressure of exhausts introduced, and can-be destroyed due to stresses resulting from the microscopic deformation. Also, since the trap is mounted in the exhaust line, its filter element is vibrated together with the traps which may result in the destruction of the filter element. These problems are observed in harsh endurance tests.

As to the requirement 5), it is sometimes necessary to integrally provide a catalytic converter on a conventional metal trap. For example, a catalyst may be integrally carried on a wall-flow type, honeycomb porous member made of a cordierite ceramic, which was originally developed as a DPF (diesel particulate filter). In such a case, it may be difficult to heat the catalyst to an operational temperature because the honeycomb porous member, having a large heat capacity, is slow to heat up.

An object of the present invention is to provide a particulate trap which is free of all the above problems and which satisfies all the requirements 1)–5).

One way to increase the filtering area of such a metal trap without unduly increasing the size of the entire trap is to weld both sides of all the filter elements to side plates with high accuracy while keeping the filter elements spaced from each other at small intervals. But such accurate welding is technically so difficult that its feasibility is doubtful Even if possible, such welding method would incur prohibitive costs.

SUMMARY OF THE INVENTION

According to the present invention, there is provided a particulate trap for use in a diesel engine comprising a filter element inserted in an exhaust line of the diesel engine. The filter element comprises two or more even number of flat filters formed from an non-woven fabric made of a heat-resistant metal and two or more even number of corrugated sheets made of a heat-resistant metal. The flat filters and the corrugated sheets are alternately laminated with one on another and spirally rolled into a columnar shape with the flat filter or the corrugated sheet inside so that the corrugations of the corrugated sheets will appear at both ends of the roll. Thus formed, odd numbered spiral spaces formed between the flat filters are closed at one end of the roll and even numbered spiral spaces are closed at the other end of the roll. Exhaust gas is introduced into the filter element from one end. The gas then passes through the flat filters and is discharged from the other end of the filter element.

The laminate of the flat filters and the corrugated sheets may be rolled with either the flat filters or the corrugated sheets inside. The laminate may be rolled so that the filter element formed has a substantially circular, oval or polygonal cross-section.

Closures for closing the spaces between the flat filters are located on each end of the filter element and may comprise protruding ends of two adjacent flat filters which are bent toward each other and welded together. Otherwise, closures may be made from a heat-resistant metal.

The corrugated sheets may be heat-resistant metal sheets or three-dimensionally reticulated porous members (similar to foam) made of a heat-resistant metal. The dimension of each corrugated sheet in the thickness direction of the filter element (i.e. the size of the spaces between the adjacent flat filters) should preferably be 10 mm or less to obtain a compact particulate trap.

To minimize pressure loss, each of the flat filters may comprise at least two layers of non-woven fabrics of heat-resistant metallic fiber having different pore sizes, the layer nearer to the exhaust gas incoming side having larger pores.

Alumina whiskers may be grown on the surface of either a single-layer or a multi-layer flat filter to trap microscopic air-borne particulates.

Also, a catalyst may be carried on each of the flat filters and/or corrugated sheets so that the particulate trap has an additional function as a catalytic converter. Such a catalyst may be carried directly on one or either side of each flat filter or on a three-dimensionally reticulated porous metallic member having pores communicating with each other and provided on one or either side of each flat filter.

With this arrangement, it is possible to increase the filtering area of the filter element without increasing its size by narrowing the spaces between the adjacent flat filters. The corrugated sheets sandwiched between the flat filters are arranged so that their corrugations extend in parallel to the direction in which exhaust gas flows in the filter element. Thus, exhaust gas can flow smoothly over the entire filtering area, so that pressure loss due to poor flow is avoided. That is, the filter is less likely to be clogged with particulates even if its pore diameter is reduced to trap particulates with higher efficiency, because the filtering surface area is fairly large, so that the amount of particulates trapped on a unit area is kept small.

Since the filter element is formed by rolling the above-described laminate, no accurate welding is necessary, so that it can be manufactured at a low cost.

A small-volume, large-surface area filter can be manufactured by welding filter members to side plates with high accuracy. But it is technically very difficult or impracticable to weld filter members to side plates while spacing them from each other at small intervals. Even if such accurate welding is possible its manufacturing cost would be extremely high. The present invention offers a solution to this problem, too.

The corrugated sheets prevent the flat filters from being minutely deformed due to the pressure of exhaust gas flowing through the particulate trap. Thus, the filter element is less likely to be damaged and durable.

Since the flat filters and the corrugated sheets are alternately laminated, the flat filters are supported at both ends. Thus, the filter vibrates less and the stress by vibration is reduced. Thus the filter is less likely to suffer fatigue failure. Hence, the durability of the filter element improves further. Since the filter element is formed by rolling the laminate, no gap is formed between the adjacent flat filters and the corrugated sheets, so that it is possible to minimize shaky movement of the filter element. This is another factor of improved durability of the filter.

By rolling the laminate, it is possible to form a filter element having any desired cross-section such as a circular, oval or polygonal section. This makes it possible to adjust the shape and size of the trap so that it can snugly fit in the space of the exhaust line. The space in the exhaust line can thus be used effectively.

By forming the filter from a non-woven fabric of a heat-resistant metal, the inside of the filter is heated uniformly during regeneration due to its high heat conductivity, so that the filter is less likely to develop heat spots or suffer heat cracks and less likely to melt or crack due to thermal stress.

To form the closures, the protruding ends of the adjacent filter plates may be bent toward each other and welded together to reduce the weight of the filter element and thus the entire trap. For the same purpose, the corrugated sheets may be formed from a three-dimensionally reticulated porous material of a heat-resistant metal.

The filter element may have pores decreasing in size from the exhaust incoming side toward the exhaust leaving side so that the filter can trap particulates uniformly over the entire thickness thereof. With this arrangements pressure loss can be kept to a minimum, so that the pressure loss property will improve further.

The distance between the adjacent flat filters is preferably 10 mm or less, because in order for a filter set in a limited space to have as large a filtering surface area as possible, the above distance has to be as small as possible. Another advantage of limiting the above distance to 10 mm or less is that particulates trapped can be burned efficiently by electric heaters mounted between the flat filters.

By growing alumina whiskers on an non-woven fabric of heat-resistant metal as a filters it is possible to reduce the pore size of the filter to such an extent that the filter can catch even microscopic air-borne particulates 2 $\mu$m or less in diameter.

In an arrangement in which a catalyst is carried on either or both sides of each flat filter made of an non-woven fabric of a heat-resistant metal, the particulate trap also serves as a catalytic converter, so that there is no need to provide a separate catalytic converter Such a catalyst may be carried on a three-dimensionally reticulated porous member of a heat-resistant metal having pores communicating with each other and provided on either or both sides of each flat filter. Otherwise, such a catalyst may be carried on each corrugated sheet. The catalyst carrier used is low in the rate at which it fills the space and thus low in heat capacity so that the catalyst carried thereon can be heated quickly by exhaust gas to temperatures at which the catalyst becomes active.

BRIEF DESCRIPTION OF THE DRAWINGS

Other features and objects of the present invention will become apparent from the following description made with reference to the accompanying drawings, in which:

FIG. 1 is a schematic perspective view of a filter element used in the present invention;

FIG. 2A is a side view of the filter element of FIG. 1;

FIG. 2B is its left end view;

FIG. 2C is its right end view;

DETAILED DESCRIPTION OF THE PREFERRED EMBODIMENT

FIG. 1 shows a filter element for use in a particulate trap embodying the present invention. The filter element 1 is a cylindrical member formed first by laminating flat filters A1 and A2 formed from an unwoven fabric of a heat-resistant metal. Next, flat filters A1 and A2 are alternately placed between with corrugated sheets B1 and B2 made of a heat-resistant thus forming several layer members. The layers members are then rolled together to form a cylindrical member.

FIGS. 2A–2C show how both ends of the filter element 1 are closed. At one end of the filter element, the odd numbered spaces, as counted from outside, defined between the flat filters A1 and A2, i.e. the spaces in which the corrugated sheet B1 is present, are closed by a closure member 2. At the other end, the even numbered spaces defined between the flat filters A1 and A2, in which the corrugated sheet B2 is inserted, are closed by another closure member 2.

Figure 3:
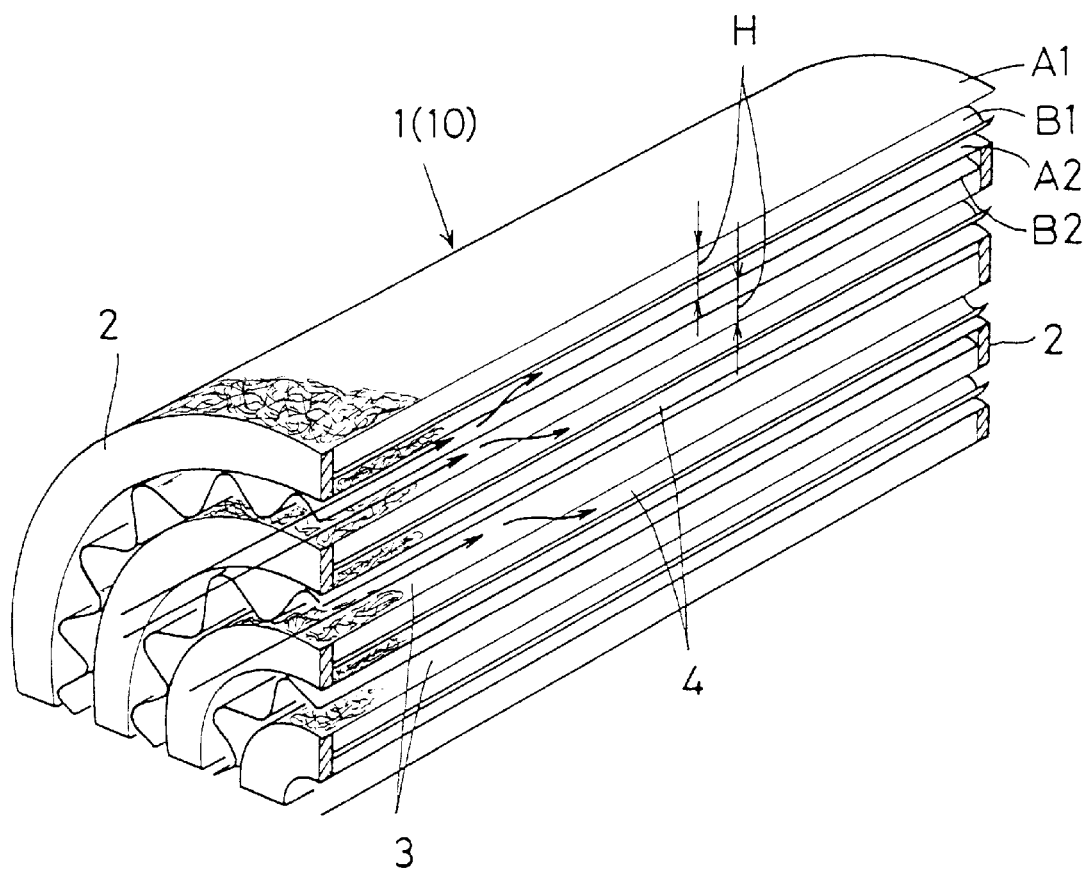
FIG. 3 is a partial perspective view of the same, showing the flow of exhaust gas.

The laminate of filters are rolled in the direction in which the corrugated sheets B1 and B2 are corrugated. If rolled in a crosswise direction, the corrugated sheets would interrupt the smooth flow of exhaust gas. Also, it would be difficult to roll the corrugated sheet in the crosswise direction. By rolling the laminate of filters in the corrugated direction, an exhaust inlet space 3 and an exhaust outlet space 4 are defined between the flat filters as shown in FIG. 3. Exhaust gas is first introduced into the exhaust inlet space 3. Next, the exhaust gas passes through the flat filters A1 and A2 into the exhaust outlet space 4. Finally, the exhaust gas leaves the filter element 1 through its rear end. The filter element 1 may also be mounted the other way around. In this case, exhaust gas is first introduced into the space 4 before passing into the space 3.

Figure 4:
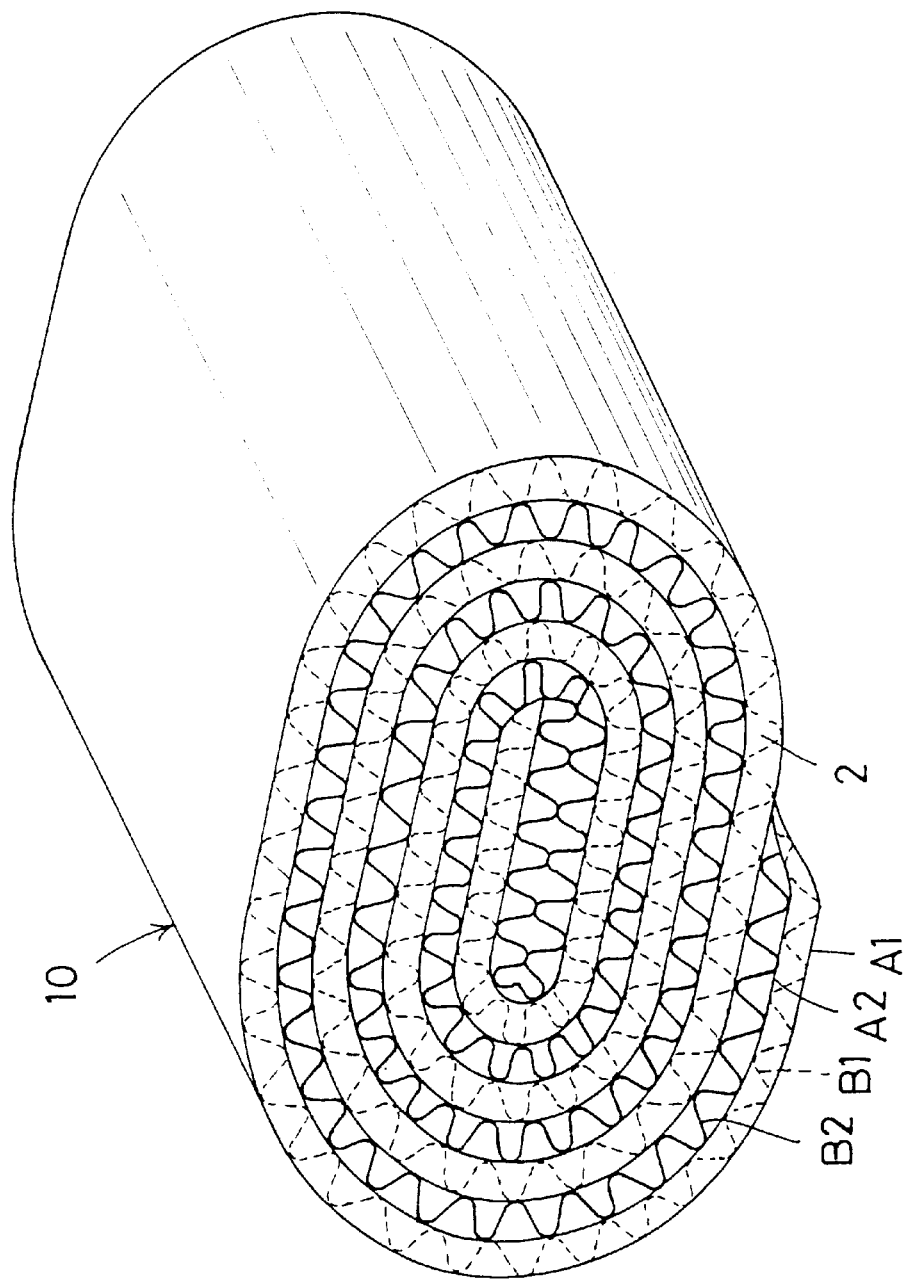
FIG. 4 is a schematic perspective view of another embodiment.

FIG. 4 shows another embodiment of filter element of this invention. This filter element 10 is formed by rolling a laminate of flat filters A1 and A2 and corrugated sheets B1 and B2 so that the filter element has an oval cross-section. Except for the cross-sectional shape, the filter element of this embodiment is structurally the same as the filter element 1 of FIG. 1.

Figure 5C:
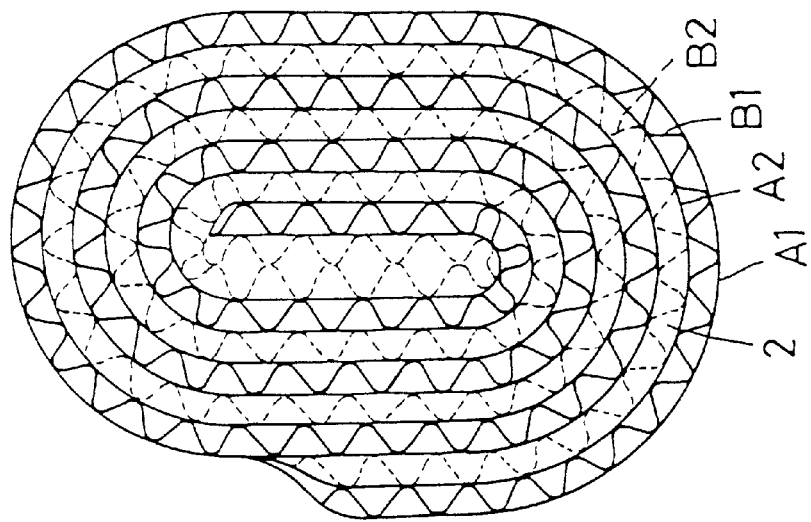
FIG. 5C is its right end view.
Figure 5B:
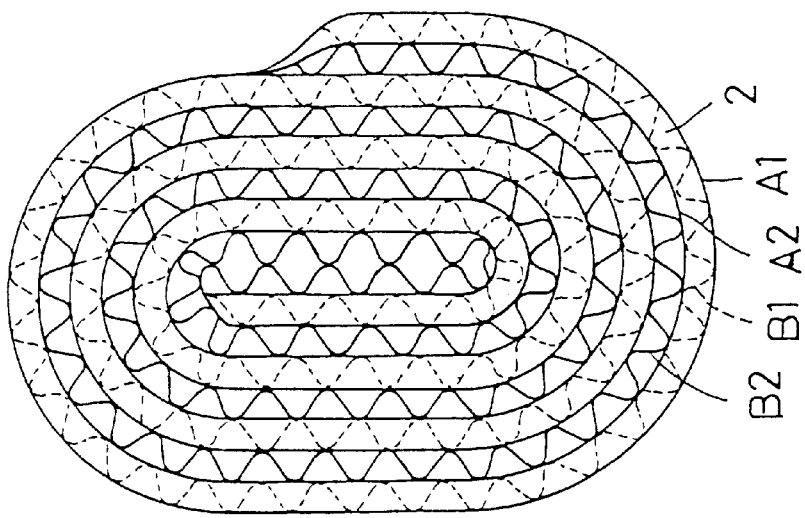
FIG. 5B is its left end view.
Figure 5A:
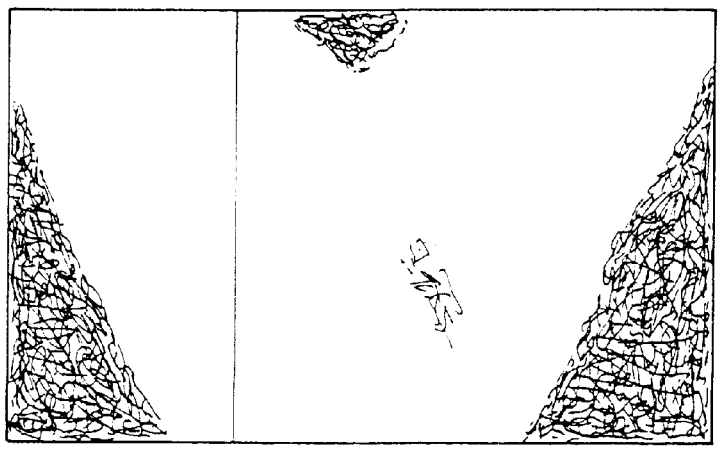
FIG. 5A is a side view thereof.

Specifically, as shown in FIG. 5, the filter element 10 of this embodiment has its alternate spaces closed by a closure member 2 at one end and at the other. Exhaust gas is introduced into the filter element at one end, passes through the flat filters and leaves the filter element at the other end, in exactly the same way as shown in FIG. 3.

The closure members 2 may be made of a filter material. In this case, exhaust gas introduced into the exhaust inlet space from one end thereof will partially flow directly toward the closure member, closing the other end of the exhaust inlet space, and pass through the closure member, instead of flowing through the flat filters into the exhaust outlet space.

Figure 6:
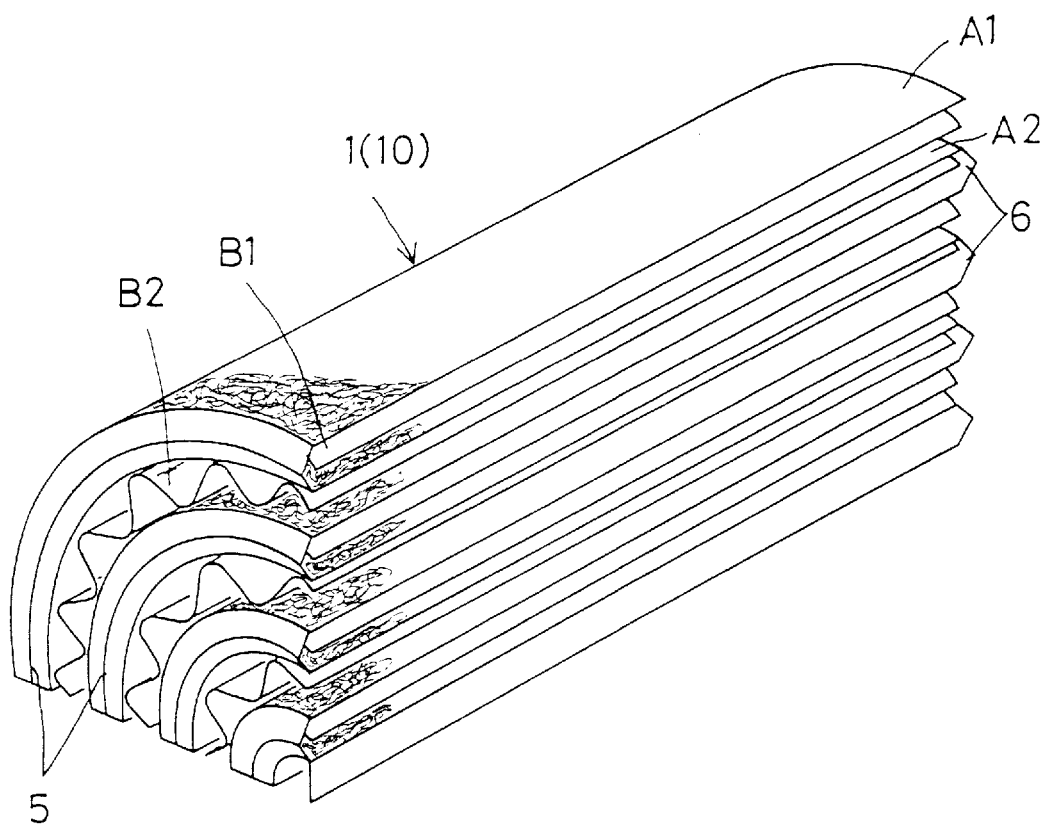
FIG. 6 is a partial perspective view of the same, showing how the spaces between the flat filters are closed at both ends thereof.

FIG. 6 shows a specific example of how the ends of the filter element are closed. As shown, the flat filters A1 and A2 are wider than the corrugated sheets B1 and B2. At one end of the filter element, the ends 5, 6 of the flat filters A1 and A2, protruding from the sheets B1 and B2, are bent toward each other to cover the space in which the corrugated sheet B1 is inserted. Ends 5 and 6 are then welded together. At the other end of the filter element, the protruding ends 5 and 6 are bent toward each other to cover the space in which the corrugated sheet B2 is inserted. Ends 5 and 6 are then welded together.

In any of the embodiments, in order to minimize the width (in the thickness direction of the filter; H in FIG. 3) of the spaces defined between the filters A1 and A2, the height of the crests of the corrugated sheets B1 and B2 should be limited to 10 mm or less.

Figure 7:
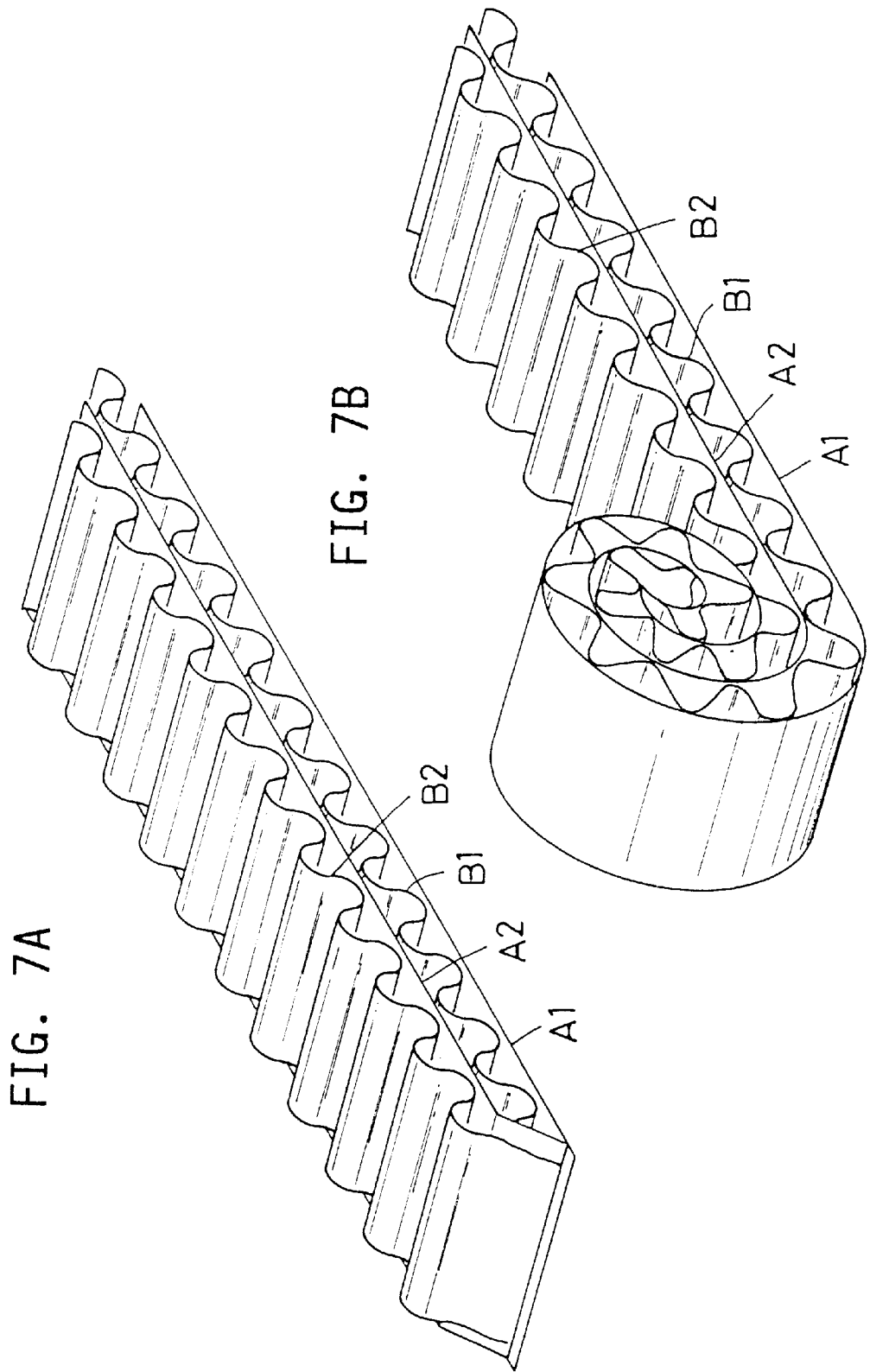
FIGS. 7A and 7B are views showing the manufacturing steps of the filter element.

FIG. 7 shows how the filter element for use in a particulate trap is manufactured. As shown in FIG. 7A, the flat filter A1, according to the present invention is laminated to corrugated sheet B1. Next, flat filter A2 and corrugated sheet B2 are laminated one on another and joined together at one end, for example, by welding. The laminate thus formed is rolled with the corrugated sheet B2 inside to form a roll member having a predetermined cross-section. In order to improve the shape retainability and strength of the filter elements every time the laminate is rolled by several turns, the end of the rolled portion of the laminate should be welded or otherwise fixed to the inner turn. When the laminate has been rolled completely, both ends are closed by closure members. The filter element shown in FIG. 1 or 4 is thus made.

Each of the flat filters A1 and A2 is a laminate of at least two non-woven fabric layers made of a heat-resistant metal, the layer nearer to the exhaust inlet space having larger pores.

Figure 8:
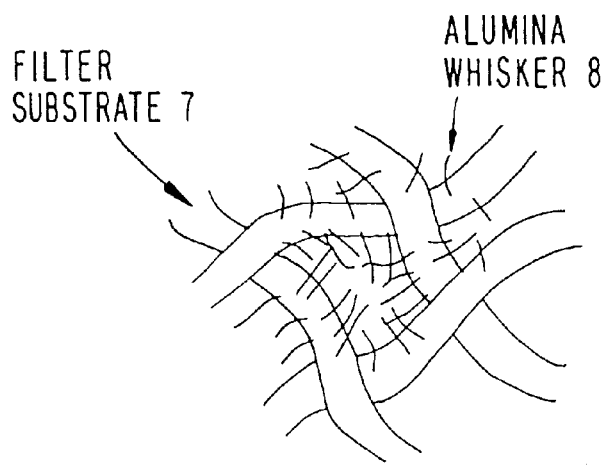
FIG. 8 is a sketch showing how alumina whiskers are grown on the filter substrate.

As shown in FIG. 8, each filter may be made of a fiber framework 7 on which are grown numerous alumina whiskers 8 that are finer than the fibers forming the framework 7. A multitude of fine pores are defined between the whiskers 8.

Figure 9:
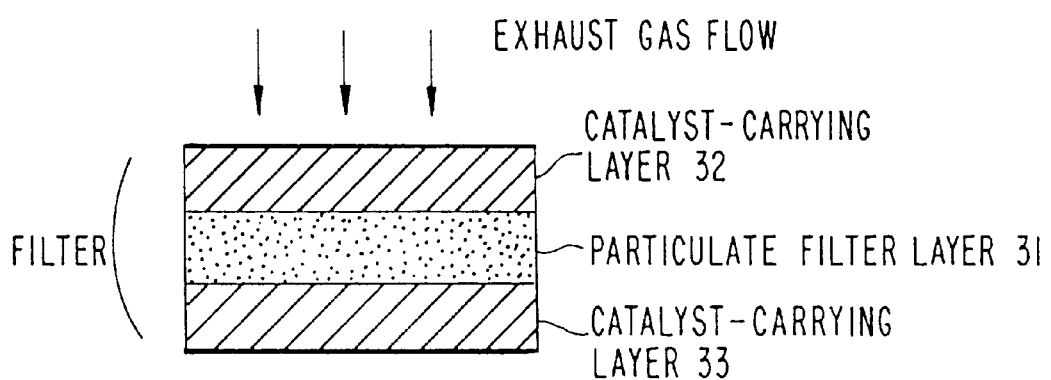
FIG. 9 is an enlarged, partial view of the filter section.

FIG. 9 is an enlarged section of a flat filter to be used in combination with a corrugated sheet. It comprises a particulate trapping layer 31 made of a filter material, and optionally a plurality of catalyst-carrying layers 32 and 33.

The corrugated sheet may be a thin plate of a heat-resistant metal. Such sheet may be punched to reduce its weight. Also, it may be a three-dimensionally reticulated porous member made of a heat-resistant metal.

Figure 10:
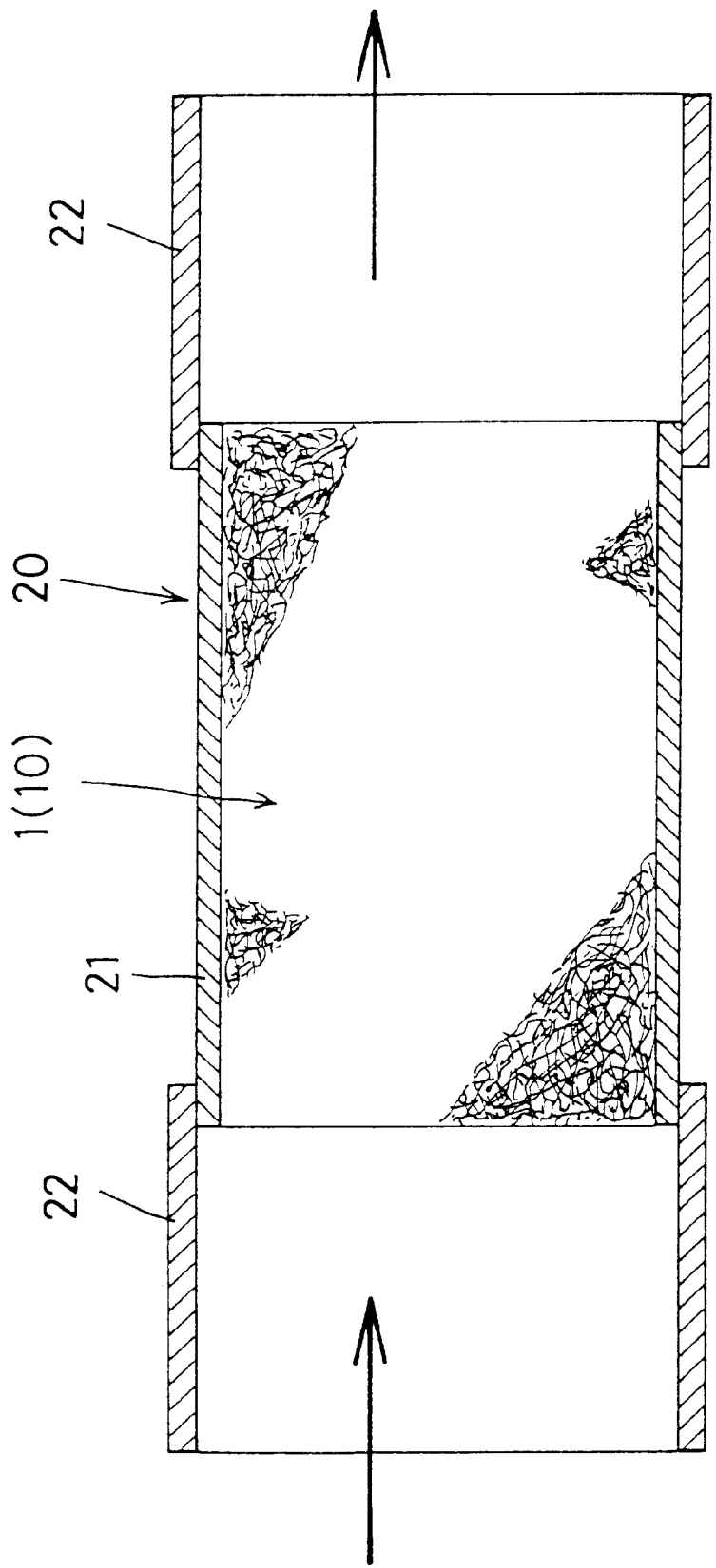
FIG. 10 is a schematic sectional view of a particulate trap according to the present invention, showing the state of use.

FIG. 10 shows a particulate trap according to the present invention This particulate trap 20 comprises a metal container 21 mounted in a diesel engine exhaust lines and one of the above-described filter elements (1 in FIG. 1 or 10 in FIG. 4) mounted in the container 21. Numeral 22 indicates a tailpipe.

Figure 11:
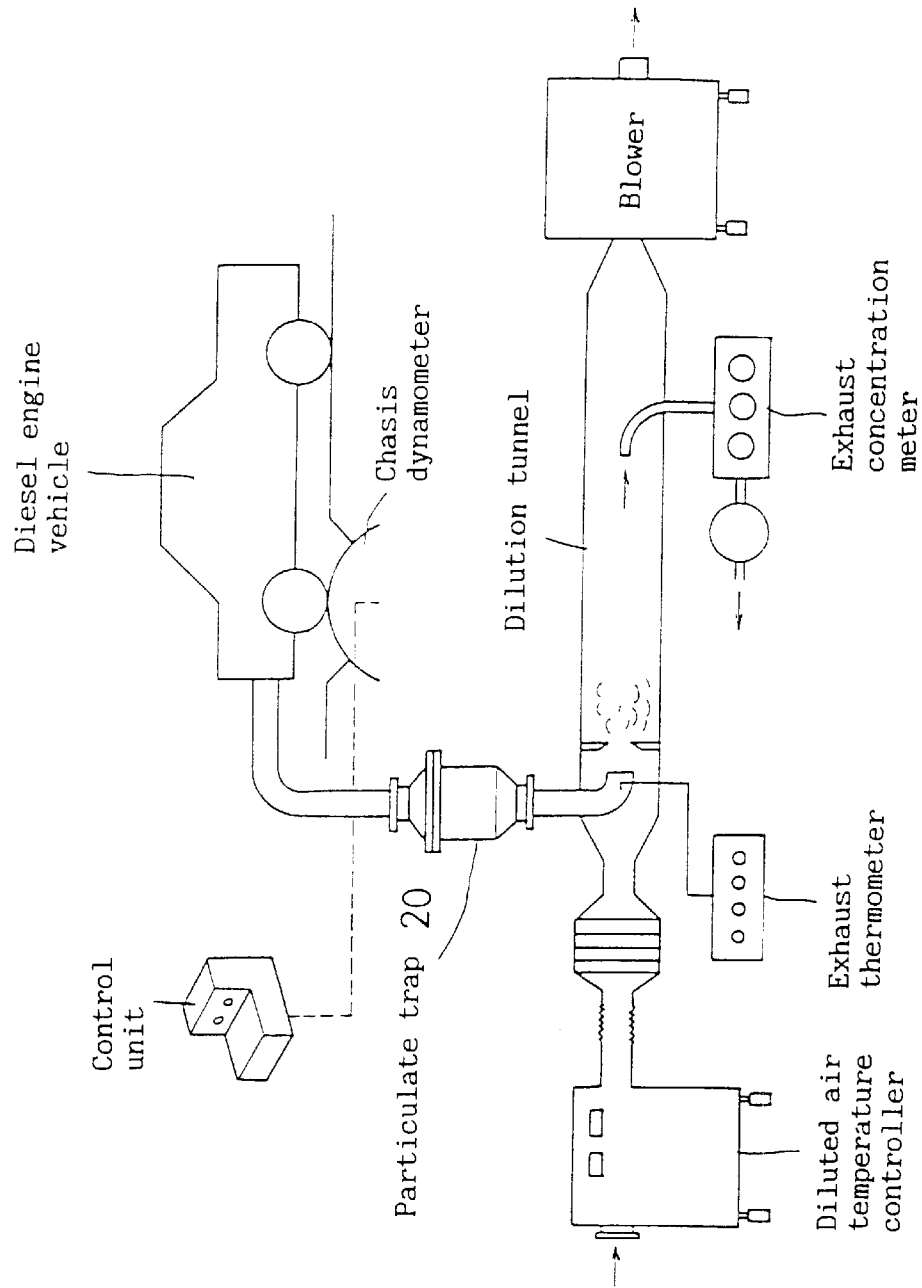
FIG. 11 is a schematic view of an experiment device for use in pressure loss and endurance tests.

FIG. 11 shows an experiment device for evaluating particulate trapping efficiency, pressure loss upon trapping particulates, durability, NO purifying rate and SOF purifying rate. This device comprises a 3400-cc, four-cylinder, direct-injection diesel engine car, chassis dynamometer and a dilution tunnel.

[Example 1]

The particulate trap 20 including the filter element shown in FIG. 1 was mounted on the experiment device shown in FIG. 11. Specimens A and B were used as the filter elements shown in Table 1. Each of Specimens A and B has an exhaust incoming surface area of 1.2 $m^2$, and is mounted in a 2.5-liter case.

While Specimens A and B were made of an Fe-Cr-Al alloy and an Ni-Cr-Al alloys respectively, they are mere examples and may have different compositions.

For comparison purposes, a honeycomb type diesel engine particulate trap (made of cordierite DHC-221 made by Japan Insulator), which has a sufficiently high particulate trapping capacity was prepared as Specimen G and subjected to the same experiment as above. This trap also had an internal volume of 2.5 liters. Hence the experiment conditions for Specimens G were identical to those for Specimens A and B.

First, the specimens were evaluated for particulate trapping efficiency and pressure loss.

Figure 12:
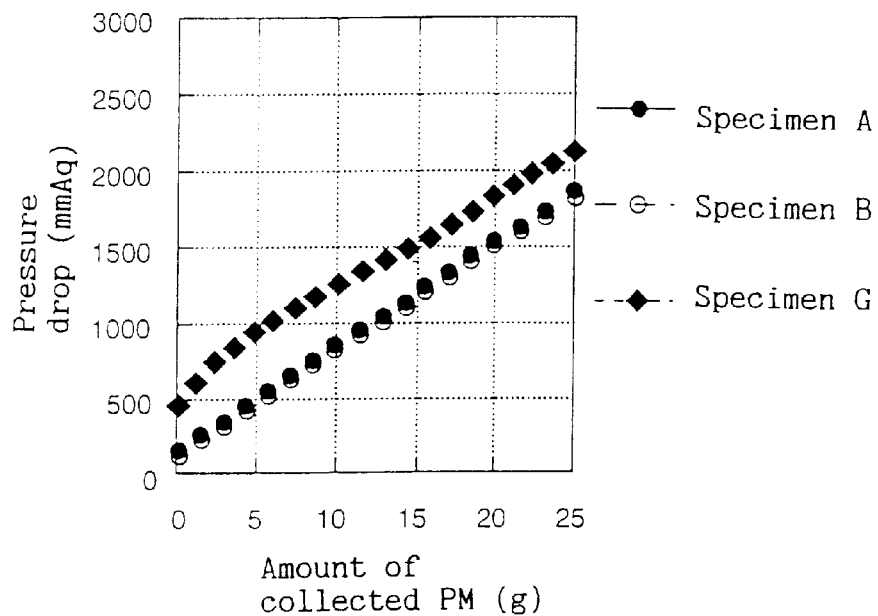
FIG. 12 is a graph showing the relationship between the pressure loss and the accumulated PM amount for Specimens A, B and G.
Figure 13:
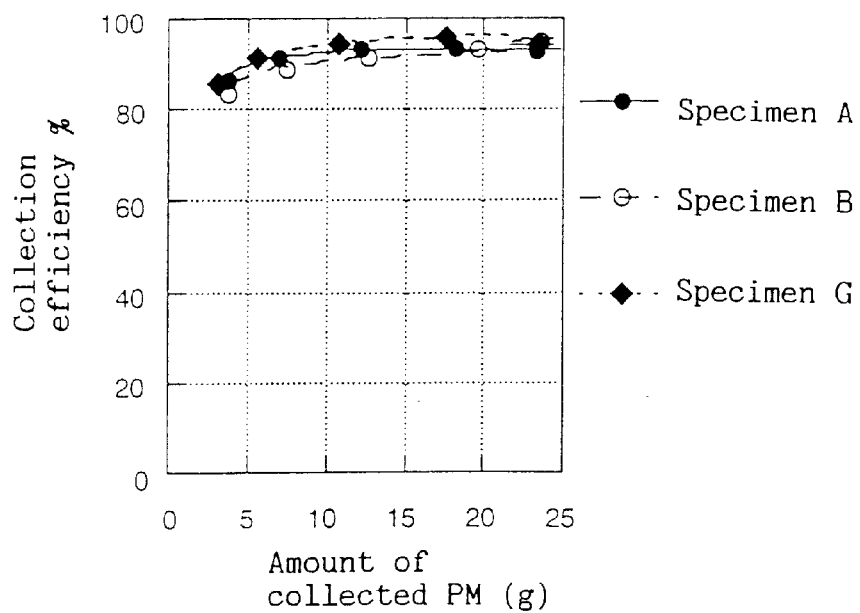
FIG. 13 is a graph showing the relationship between the particulate trapping efficiency and the accumulated PM amount for Specimens A, B and G.

The experiment results are shown in FIGS. 12 and 13, which show, as the particulate trapping capacity for each specimen, the pressure loss and the particulate trapping efficiency as a function of the amount of particulates trapped. The results clearly show that Specimen A and B have as high a particulate trapping capacity as Specimen G, i.e. a honeycomb type diesel engine particulate trap made of cordierite.

Next, each filter element specimen was tested for durability during regeneration.

In this tests when 15 grams of particulates discharged from the diesel engine had been trapped, the engine was slowed down to idling and an electric heater surrounding the entire surface of the particulate trapping surfaces of the filters was activated to regenerate the particulate trap by introducing gas heated to 600° C. by the heater into the trap. After each of Specimens A, B and G was regenerated five times in the above manner, the levels of deterioration were recorded. The results are shown in Table 2.

As shown in Table 2, Specimens A and B were not broken, while Specimen G suffered cracks.

As is apparent from these experiment results, Specimens A and B according to the present invention show excellent particulate trapping and pressure loss characterists, comparable to a honeycomb type cordierite trap, and can withstand regeneration by burning.

[Example 2]

The particulate trap 20 including the filter element shown in FIG. 2 was mounted on the experiment device of FIG. 11. Specimens C and D were used as the filter elements shown in Table 3. Each of Specimens C and D had an exhaust incoming surface area of 1.2 $m^2$, and was mounted in a 2.5-liter case. Each of Specimens C and D comprises a NOx catalyst-carrying layer (32 in FIG. 9), a particulate-trapping layer (31 of FIG. 9), and another NOx catalyst-carrying layer (33 of FIG. 9). The NOx catalyst-carrying layers of Specimen D comprise a substrate (metallic fabric) formed by Ni-Cr-Al-alloying an Ni-based three-dimensionally reticulated porous material (trade name: CELMET® #7) made by Sumitomo Electric Industries Ltd and coated with γ-alumina at the rate of 100 grams per liter of the metallic fabric to carry a catalyst. A Cu catalyst was then uniformly carried on the substrate at the rate of 1.0 gram per liter of the metallic fabric.

While Specimens C and D were made of an Fe-Cr-Al alloy and an Ni-Cr-Al alloy, respectively, they are mere examples and may have different compositions.

For comparison purposes, the same Specimen G as used in Example 1 was subjected to the same experiment as above. This trap also had an internal volume of 2.5 liters so that the experiment conditions for Specimens G were identical to those for Specimens C and D.

Particulate trapping efficiency and pressure loss were evaluated.

Figure 14:
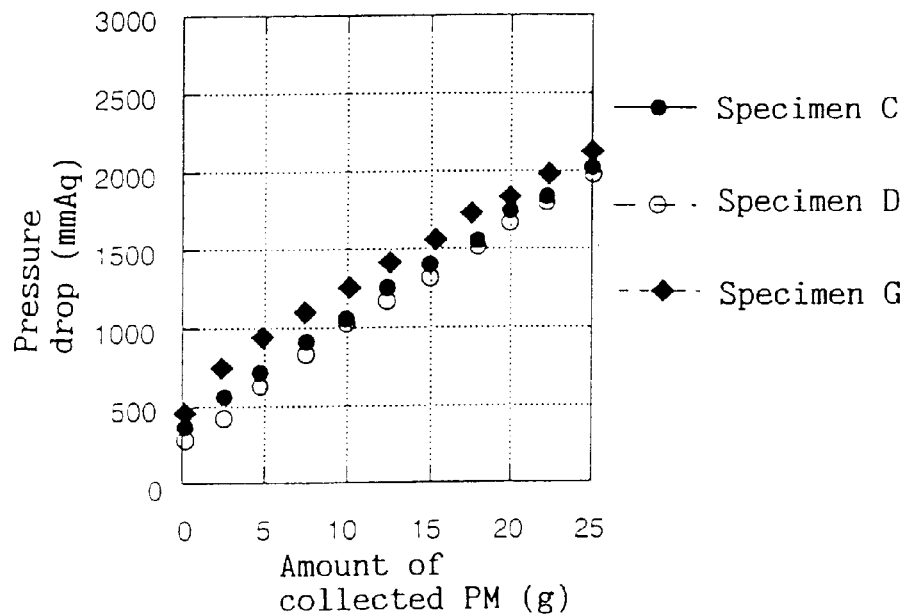
FIG. 14 is a graph showing the relationship between the pressure loss and the accumulated PM amount for Specimens C, D and G.
Figure 15:
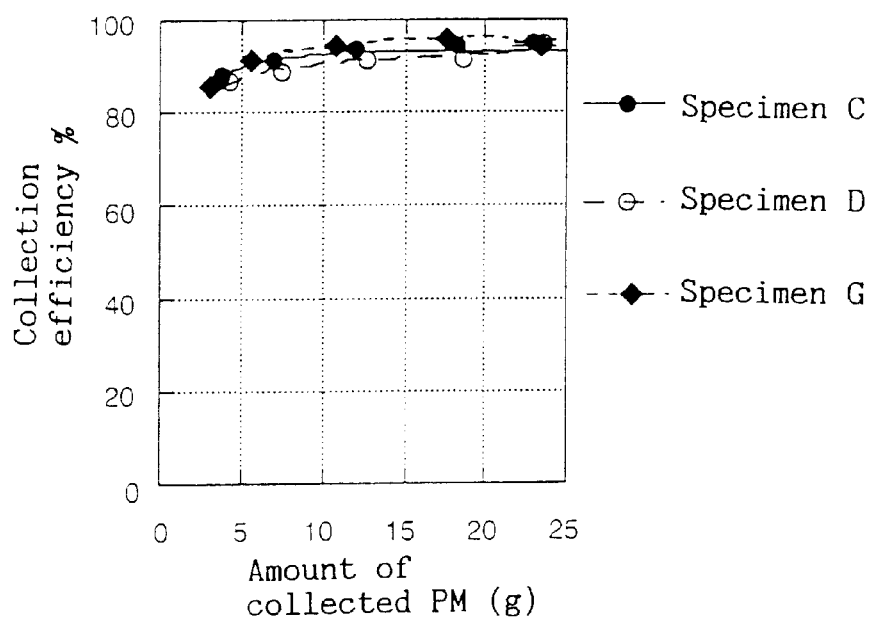
FIG. 15 is a graph showing the relationship between the particulate trapping efficiency and the accumulated PM amount for Specimens C, D and G.

The experiment results are shown in FIGS. 14 and 15, which show, as the particulate trapping capacity for each specimen, the pressure loss and the particulate trapping efficiency as a function of the amount of particulates trapped. The results clearly show that Specimens C and D have as high a particulate trapping capacity as Specimen G, i.e. a honeycomb type diesel engine particulate trap made of cordierite.

Next, each filter element specimen was tested for durability during regeneration. Each specimen was subjected to an identical number of regenerations as in Example 1. After this test, the specimens were observed for deterioration. The results are shown in Table 4.

As shown in Table 4, Specimens C and D were not broken, while Specimen G suffered cracks.

Specimens C and D were then tested for NO purifying rate.

In this test, $C_2H_4$ was introduced into exhaust gas as a reducing agent. The exhaust gas conditions are shown in Table 5.

NO concentrations were measured with the exhaust gas temperature maintained at 250° C. for two minutes. Their average values are shown in Table 6.

By using Specimens C and D, the NO concentration decreased in half.

As is apparent from these experiment results, Specimens C and D according to the present invention show excellent particulate trapping and pressure loss characteristics, comparable to a honeycomb type cordierite trap, and were able to withstand regeneration by burning with high reliability. Further, since these specimens have a NO-decreasing capacity, there is no need to provide a separate catalytic converter. Thus, it is possible to reduce the installation space and manufacturing cost of the entire diesel engine exhaust gas treatment device.

[Example 3]

The particulate trap 20 including the filter element shown in FIG. 1 was mounted on the experiment device of FIG. 11. Specimens E and F were used as the filter elements shown in Table 7 were each of Specimens E and F had an exhaust incoming surface area of 1.2 m², and was mounted in a 2.5-liter case. Each of Specimen E and F comprises a particulate-trapping layer (31 of FIG. 9). and a SOF catalyst-carrying layer (33 of FIG. 9). The latter layer comprises a substrate (metallic fabric) formed by Ni-Cr-Al-alloying an unwoven fabric of metallic fiber or an Ni-based three-dimensionally reticulated porous material (trade name: CELMET® #7) made by Sumitomo Electric Industries Ltd and coated with γ-alumina at the rate of 150 grams per liter of the metallic fabric to carry a catalyst. A Cu catalyst was then uniformly carried on the substrate at the rate of 1.5 grams per liter of the metallic fabric.

While the metallic unwoven fabrics, metallic porous members and metallic corrugated sheets forming Specimens E and F were made of an Fe-Cr-Al alloy and an Ni-Cr-Al alloy, respectively, they are mere examples and may have different compositions.

For comparison purposes, the same Specimen G as used in Example 1 was subjected to the same experiment as above. This trap also had an internal volume of 2.5 liters so that the experiment conditions for Specimens G were identical to those for Specimens E and F.

Figure 16:
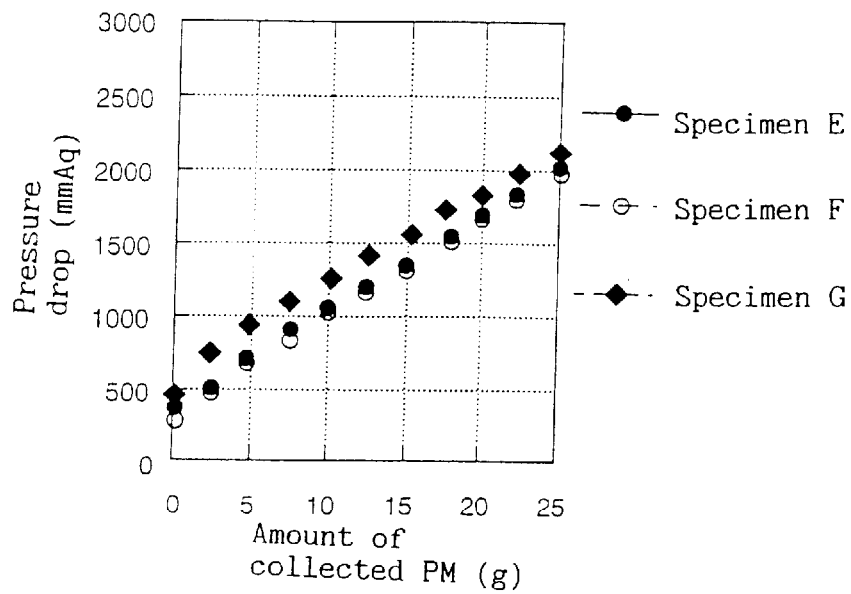
FIG. 16 is a graph showing the relationship between the pressure loss and the accumulated PM amount for Specimens E, F and G.
Figure 17:
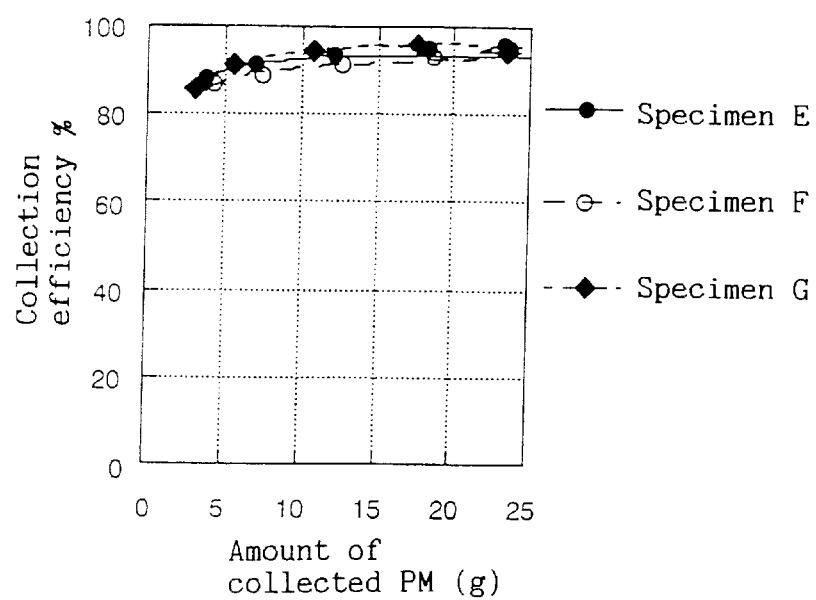
FIG. 17 is a graph showing the relationship between the particulate trapping efficiency and the accumulated PM amount for Specimens E, F and G.

Particulate trapping efficiency and pressure loss were evaluated. The results are shown in FIGS. 16 and 17, which show, as the particulate trapping capacity for each specimen, the pressure loss and the particulate trapping efficiency as a function of the amount of particulates trapped. The results clearly show that Specimens E and F have as high a particulate trapping capacity as Specimen G, i.e. a honeycomb type diesel engine particulate trap made of cordierite.

Next, each filter element specimen was tested for durability during regeneration.

The number of times each specimen was subjected to regeneration and other test conditions were the same as in Examples 1 and 2. After the five-time regeneration tests, each specimen was observed to see if and how much it had deteriorated. The results are shown in Table 8.

As shown in Table 8, Specimens E and F were not broken, while Specimen G suffered cracks.

Specimens E and F were then tested for SOF purifying rate.

This test was conducted with the exhaust gas temperature kept at 250° C. and 350° C. The test results are shown in Table 9.

By using Specimens E and F, which both carry Pt catalysts the SOF concentration decreased by 40% or 50%.

As is apparent from these experiment results, Specimens E and F according to the present invention show excellent particulate trapping and pressure loss characteristics, comparable to a honeycomb type cordierite trap, and were able to withstand regeneration by burning with high reliability. Further, since these specimens have a SOF-decreasing capacity, there is no need to provide a separate catalytic converter. Thus, it is possible to reduce the installation space and manufacturing cost of the entire diesel engine exhaust gas treatment device.

The particulate trap according to the present invention is small in size while maintaining a sufficiently large filtering surface area with attendant high particulate trapping efficiency and minimum pressure loss. Due to its metallic nature, it can well withstand regeneration. Overall, it is a high-performance trap and can prevent air pollution resulting from particulates dispersed into the atmosphere.

Since the filter element is formed by rolling a laminate of flat filters formed from an unwoven fabric of heat-resistant metallic fiber, and corrugated sheets of a heat-resistant metal, it is highly resistant to gas pressure and vibrations. Thus, it is possible to reduce the weight of the trap without sacrificing its durability, and to regenerate the filter element at a low energy cost. Also, such a filter element can be manufactured at a low cost because no accurate welding is necessary.

Since the cross-sectional shape of the filter element can be modified simply by changing the way the laminate is rolled, it can be shaped according to the shape of the exhaust space in a diesel engine car in which the particulate trap is mounted.

By using a filter material whose pore diameter decreases gradually toward the exhaust outlet side, it is possible to minimize the possibility of clogging the filter, so that the pressure loss property is improved further.

By growing alumina whiskers on the surface of the filter framework, the pore size of the filter can be reduced. This makes it possible to catch air-borne particulates 2 μm or less in diameter and also to increase the catalyst-carrying area.

By having a catalyst carried on the filter, it is possible to eliminate the necessity of separately providing a catalytic converter. This in turn makes it possible to reduce the size and cost of the exhaust treatment device. Since the filter substrate is low in heat capacity, the catalyst can be easily heated to temperatures at which it becomes active. The particulate trap according to the invention will greatly contribute to the reduction of pollution of the environment.

TABLE 1

| | Filter element | | | | | | | |
|---|---|---|---|---|---|---|---|---|
| | Flat filter | | | | | Corrugated plate | | |
| | Shape | Material | Thickness | Packing density | Filter area | Shape | Material | Structure |
| Specimen A (Invented) | Unwoven metal fabric (fiber 20 μm dia) | Fe—Cr—Al | 0.5 mm | 20% | 1.2 m$^2$ | Metallic film | Fe—Cr—Al | FIG. 1 |
| Specimen B (Invented) | Unwoven metal fabric (2-layer, 25 μm, 15 μm dia) | Ni—Cr—Al | 0.8 mm | 20% | 1.2 m$^2$ | CELMET ®$^{\#7}$ | Ni—Cr—Al | FIG. 1 |
| Specimen G (Comparative) | Foamed ceramic | MgO—Al$_2$O$_3$—SiO$_2$ (cordierite) | 0.5 mm | 50% | 2.3 m$^2$ | — | — | — |

Note:
CELMET ® is a three-dimensional reticulated porous member produced by Sumitomo Electric Industries Ltd.
$^{\#7}$is model number, which indicates that the number of cells is 50–70 per unit length (1 inch).

TABLE 2

| | Regeneration test result |
|---|---|
| Specimen A (Invented) | Not broken |
| Specimen B (Invented) | Not broken |
| Specimen G (Comparative) | Crack formed |

TABLE 4

| | Regeneration test result |
|---|---|
| Specimen C (Invented) | Not broken |
| Specimen D (Invented) | Not broken |
| Specimen G (Comparative) | Crack formed |

TABLE 3

| | Filter element | | | | | | | |
|---|---|---|---|---|---|---|---|---|
| | Flat filter | | | | | Corrugated plate | | |
| | Shape | Material | Thickness | Packing density | Filter area | Shape | Material | Structure |
| Specimen C (Invented) | (1) Unwoven metal fabric (fiber 100 μm dia) + γ-Al$_2$O$_3$ + Cu (2) Unwoven metal fabric (fiber 20 μm dia) (3) Unwoven metal fabric (fiber 100 μm dia) + γ-Al$_2$O$_3$ + Cu 3-layer | (1) Fe—Cr—Al + γ-Al$_2$O$_3$ + Cu (2) Fe—Cr—Al (3) Fe—Cr—Al + γ-Al$_2$O$_3$ + Cu | 1.5 mm | 20% | 1.2 m$^2$ | Metallic film | Fe—Cr—Al | FIG. 2 |
| Specimen D (Invented) | (1) CELMET ®$^{\#7}$ + γ-Al$_2$O$_3$ + Cu (2) Unwoven metal fabric (fiber 20 μm dia) (3) CELMET ®$^{\#7}$ + γ-Al$_2$O$_3$ + Cu 3-layer | (1) Ni—Cr—Al + γ-Al$_2$O$_3$ + Cu (2) Ni—Cr—Al (3) Ni—Cr—Al + γ-Al$_2$O$_3$ + Cu | 1.5 mm | 20% | 1.2 m$^2$ | CELMET ®$^{\#7}$ | Ni—Cr—Al | FIG. 2 |
| Specimen G (Comparative) | Foamed ceramic | MgO—Al$_2$O$_3$—SiO$_2$ (Cordierite) | 0.5 mm | 50% | 2.3 m$^2$ | — | — | — |

Note:
CELMET ® is a three-dimensional reticulated porous member produced by Sumitomo Electric Industries Ltd.
$^{\#7}$is model number. It indicates that the number of cells is 50–70 per inch.

TABLE 5

| Item | Condition |
| --- | --- |
| NO concentration in exhausts | 1000 ppm |
| $C_2H_4$ concentration in exhausts | 250 ppm |
| $O_2$ concentration in exhausts | 2% |
| Exhaust temperature | 250° C. |

TABLE 6

| | NO concentration |
| --- | --- |
| Specimen C (Invented) | 500 ppm |
| Specimen D (Invented) | 500 ppm |

TABLE 7

| | Filter element | | | | | | | |
| --- | --- | --- | --- | --- | --- | --- | --- | --- |
| | Flat filter | | | | | Corrugated plate | | |
| | Shape | Material | Thickness | Packing density | Filter area | Shape | Material | Structure |
| Specimen E (Invented) | (1) Unwoven metal fabric (fiber 20 μm dia) (2) Unwoven metal fabric (fiber 100 μm dia) + $\gamma$-$Al_2O_3$ + Pt 2-layer | (1) Fe—Cr—Al (2) Fe—Cr—Al + $\gamma$-$Al_2O_3$ + Pt | 1.0 mm | 20% | 1.2 $m^2$ | Metallic film + $\gamma$-$Al_2O_3$ + Pt | Fe—Cr—Al + $\gamma$-$Al_2O_3$ + Pt | FIG. 1 |
| Specimen F (Invented) | (1) Unwoven metal fabric (fiber 20 μm dia) (2) CELMET ®[#7] + $\gamma$-$Al_2O_3$ + Pt 2-layer | (1) Ni—Cr—Al (2) Ni—Cr—Al + $\gamma$-$Al_2O_3$ + Pt | 1.0 mm | 20% | 1.2 $m^2$ | CELMET ®[#7] + $\gamma$-$Al_2O_{3+Pt}$ | Ni—Cr—Al + $\gamma$-$Al_2O_3$ + Pt | FIG. 1 |
| Specimen G (Comparative) | Foamed ceramic | MgO—$Al_2O_3$—$SiO_2$ (Cordierite) | 0.5 mm | 50% | 2.3 $m^2$ | — | — | — |

Note:
CLEMET ® is a three-dimensional reticulated porous member produced by Sumitomo Electric Industries Ltd.
[#7] is model number, which indicates that the number of cells is 50–70 per inch.

TABLE 8

| | Regeneration test result |
| --- | --- |
| Specimen E (Invented) | Not broken |
| Specimen F (Invented) | Not broken |
| Specimen G (Comparative) | Crack formed |

TABLE 9

| | SOF removing rate (%) | |
| --- | --- | --- |
| | Exhaust temperature 250° C. | Exhaust temperature 350° C. |
| Specimen E (Invented) | 40 | 50 |
| Specimen F (Invented) | 40 | 50 |

What is claimed is:

1. A particulate trap for use in a diesel engine comprising:
a filter element comprising two or more even number of spiral layer members, each said spiral layer member comprising a filter formed from a non-woven fabric made of a heat resistant metal and a corrugated sheet made of a heat resistant metal laminated with an inner side of said filter;
each said spiral layer member having a closed edge comprised of two adjacent ends of said filters joined together, and an open edge;
said spiral layer members being laminated with one another so as to define a plurality of spiral exhaust spaces;
wherein said spiral layer members are arranged such that said closed edges of said spiral layer members are located at even numbered spiral exhaust spaces and said open edges of said spiral layer members are located at odd numbered spiral exhaust spaces at one end of said filter element, and said closed edges of said spiral layer members are located at odd numbered spiral exhaust spaces and said open edges of said spiral layer members are located at even numbered spiral exhaust spaces at an opposite end of said filter element.

2. A particulate trap as claimed in claim 1 wherein said filter element has one of a substantially circular, oval, or polygonal cross-section.

3. A particulate trap as claimed in claim 1 wherein said closed edges are comprised of two adjacent ends of said filters welded together.

4. A particulate trap as claimed in claim 1 wherein said corrugated sheets are formed from a three-dimensionally reticulated porous member.

5. A particulate trap as claimed in claim 1 wherein said filters are spaced 10 millimeters or less from each other.

6. A particulate trap as claimed in claim 1 wherein said filter element has an exhaust entrance and an exhaust exit;
said filters further comprise at least two layers of non-woven fabric of heat-resistant metallic fiber having differing pore sizes; and
wherein said layers are arranged in order of decreasing pore size with the layer having the largest pore size located nearest said exhaust entrance and the layer having the smallest pore size located nearest said exhaust exit.

7. A particulate trap as claimed in claim 1 wherein said corrugated sheets has a catalyst on at least one side thereof.

8. A particulate trap as claimed in claim 1 wherein said filters comprise a non-woven fabric carrying a catalyst on at least one side thereof.

9. A particulate trap as claimed in claim 1 wherein said filters comprise a catalyst carrying, three-dimensionally reticulated porous layer made of a heat-resistant metal located on at least one side of said filter.

10. A particulate trap as claimed in claim 1 wherein said filters are formed of a non-woven fabric with alumina whiskers grown thereon.

11. A particulate trap as claimed in claim 2 wherein said closed edges are comprised of two adjacent ends of said filters welded together.

12. A particulate-trap as claimed in claim 2 wherein said corrugated sheets are formed from a three-dimensionally reticulated porous member.

13. A particulate trap as claimed in claim 3 wherein said corrugated sheets are formed from a three-dimensionally reticulated porous member.

14. A particulate trap as claimed in claim 2 wherein said filters are spaced 10 millimeters or less from each other.

15. A particulate trap as claimed in claim 3 wherein said filters are spaced 10 millimeters or less from each other.

16. A particulate trap as claimed in claim 4 wherein said filters are spaced 10 millimeters or less from each other.

17. A particulate trap as claimed in claim 2 wherein said filter element has an exhaust entrance and an exhaust exit;

said filters further comprise at least two layers of non-woven fabric of heat-resistant metallic fiber having differing pore sizes; and wherein said layers are arranged in order of decreasing pore size with the layer having the largest pore size located nearest said exhaust entrance and the layer having the smallest pore size located nearest said exhaust exit.

18. A particulate trap as claimed in claim 3 wherein said filter element has an exhaust entrance and an exhaust exit;

said filters further comprise at least two layers of non-woven fabric of heat-resistant metallic fiber having differing pore sizes; and wherein said layers are arranged in order of decreasing pore size with the layer having the largest pore size located nearest said exhaust entrance and the layer having the smallest pore size located nearest said exhaust exit.

19. A particulate trap as claimed in claim 4 wherein said filter element has an exhaust entrance and an exhaust exit;

said filters further comprise at least two layers of non-woven fabric of heat-resistant metallic fiber having differing pore sizes; and wherein said layers are arranged in order of decreasing pore size with the layer having the largest pore size located nearest said exhaust entrance and the layer having the smallest pore size located nearest said exhaust exit.

20. A particulate trap as claimed in claim 1 wherein said filter element has a columnar shape.

* * * * *